United States Patent [19]

Kato et al.

[11] Patent Number: 5,187,597
[45] Date of Patent: Feb. 16, 1993

[54] DISPLAY UNIT

[75] Inventors: Masayuki Kato; Junji Tomita; Tsuyoshi Matsumoto, all of Atsugi; Hirokazu Aritake; Shin Eguchi, both of Isehara, all of Japan

[73] Assignee: Fujitsu Limited, Kawasaki, Japan

[21] Appl. No.: 719,230

[22] Filed: Jun. 21, 1991

[30] Foreign Application Priority Data

Jun. 29, 1990 [JP] Japan ............................ 2-170224
Feb. 4, 1991 [JP] Japan ............................ 3-013343

[51] Int. Cl.⁵ .............................................. G02B 5/32
[52] U.S. Cl. ....................................... 359/22; 359/13; 359/15; 359/630
[58] Field of Search .................. 359/22, 23, 13, 15, 359/630, 14, 634

[56] References Cited

U.S. PATENT DOCUMENTS

| 4,763,990 | 8/1988 | Wood ............................... 359/634 |
| 4,919,517 | 4/1990 | Jost et al. ........................ 359/630 |
| 5,035,473 | 7/1991 | Kuwayama et al. ............ 359/630 |

FOREIGN PATENT DOCUMENTS 2-242218 9/1990 Japan.

Primary Examiner—Janice A. Howell
Assistant Examiner—Kim-Kwok Chu
Attorney, Agent, or Firm—Armstrong, Westerman, Hattori, McLeland & Naughton

[57] ABSTRACT

A display unit including an indicator (1) for projecting a predetermined image, an image forming optical system (3) for forming a real image at a predetermined position according to the image projected by the indicator, and a transparent hologram screen (10) disposed at the image forming position of the image forming optical system to diffract the real image in a predetermined direction with a directivity.

29 Claims, 18 Drawing Sheets

Fig.1
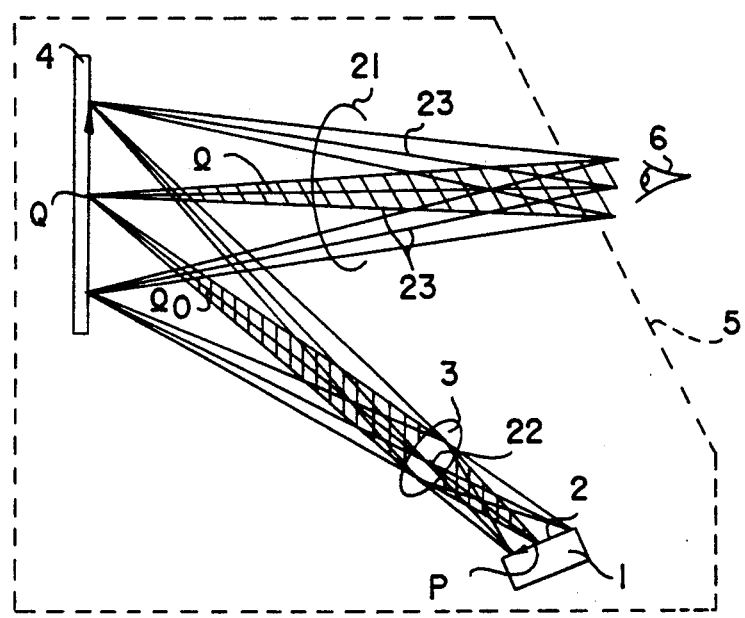
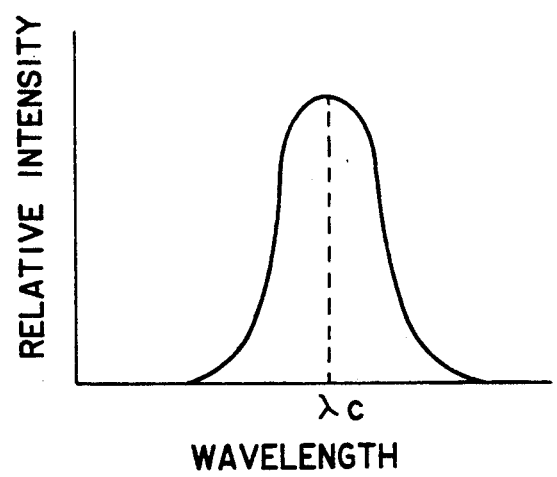
Fig.2

DISPLAY UNIT

BACKGROUND OF THE INVENTION

1. Field of the Invention

The present invention relates to a display unit employing an image forming optical system for forming an image on a transparent screen according to an image provided by an indicator, and particularly, to a head-up display type unit for displaying an image over a background in a field of view.

Head-up displays for displaying indications of various instruments over a front view (a background) are conventionally used in aircraft, particularly combat planes, and recently have become frequently used in automobiles, to improve safety.

Such head-up displays would prove useful and convenient to reduce fatigue and improve efficiency if applicable to a clerk's window in a banks, etc., to speech or lecture tables, and to sportscaster's seats, because the head-up display can display an image (second information) from an indicator over a front view (first information) so that a clerk at the window, a lecturer, or a sportscaster can keep his or her eyes on the first information (such as a customer, an audience, or a game) and simultaneously observe the second information (such as account information, lecture materials, and data of athletes) without moving his or her eyes each time.

The present invention has been developed to meet the above requirements. Note, the present invention is not limited to the above applications but is applicable to any kind of display units, such as display units of personal computers, word processors, and other office automation equipment.

2. Description of the Related Art

Display units of personal computers and word processors are, for example, CRTs, liquid crystal display units, and plasma display units, and these conventional display units have a plate-like or box-like shape and are opaque, and thus a user cannot look at something else while closely observing the screen of the display unit. If the user wants to look at information displayed on the display unit while looking at something else, the user must move his or her eyes toward the display unit and away from the thing at which the user is looking. If the display unit is transparent, however the user can see both a background and an image on the display unit without moving his or her eyes.

One technique of overlaying a background and a displayed image one upon another is the head-up display (HUD). This technique forms an image (a virtual image) provided by an indicator in a field of view of a user, and the virtual image is displayed as at a distance, and thus the user is not required to move his or her eyes or the focal points of the eyes (FIG. 29). In FIG. 29, a background image and an image from an indicator 105 through a transmission-type hologram 103 overlap on an image combiner 101. The image combiner 101 is usually a reflection-type hologram, because a reflection-type hologram has wavelength selectivity which can improve the efficiency of use of both the indicator light and the background light. The head-up display itself is a known technique, and therefore, is not explained in more detail.

The head-up display technique is naturally applicable for the transparent display unit mentioned above, but is not easily applied because a virtual image (an indication) is not formed on the surface of a device (the surface of an image combiner). A conventional display unit (such as a CRT and a liquid crystal display) cannot be employed, simply because it appears incongruous and because the surface of the image combiner must be brought too close to the eyes of the user when an image is displayed at a least distance of distinct vision (e.g., about 30 cm).

These problems will be explained with reference to FIG. 29. The HUD comprises the indicator 105, transmission-type hologram 103, and reflection-type hologram (image combiner) 101. An image provided by the indicator 105 forms a virtual image Iv through the two holograms 103 and 101 on the opposite side of the image combiner 101 with respect to the eyes of a user, so that the displayed image (virtual image) Iv and a back ground B overlap. A direction of light diffracted or reflected by a hologram depends on the wavelength of the light incident thereon (wavelength dispersion). When light having a wide wavelength band is used instead of a monochromatic light such as a laser beam, the wavelength dispersion is usually compensated with two holograms. A hologram is originally meaningful when used as an image combiner. To correct any chromatic aberration, a pair of holograms (101 and 103) is used, but it is difficult to form an image forming system having a large screen and a short focal length (a short distance between a virtual image and the image combiner) with two holograms, because this increases a numerical aperture, and thus does little to correct the chromatic aberration. Unlike a conventional display unit (a light emission type), the head-up display cannot align the position of the device (a display screen) with the position of a displayed image, and therefore, to see an image at a least distance of distinct vision (about 30 cm), the image combiner must be very close to the face of a user, which is not practical.

An object of the invention is to realize a display unit which is transparent and having a display screen substantially aligned with the surface of the unit.

SUMMARY OF THE INVENTION

To achieve the object, according to the present invention, in an image forming system which forms an image indicated by a small-sized indicator on a surface of a hologram, the hologram has a function of deflecting spherical wave light which diverges from a position (e.g., a pupil position) of the image forming system, toward the positions of the eyes of a user of the display unit. To expand a range of view field in which a displayed image can be seen, the invention may employ multilayered or multi-recorded holograms which deflect spherical wave light diverging from the pupil position of the image forming system, in different directions around the eyes of the user.

Namely, the invention provides a display unit comprising an indicator for projecting a predetermined image, an image forming optical system for forming a real image at a predetermined position according to the image projected by the indicator, and a transparent hologram screen disposed at an image forming position of the image forming optical system to diffract the real image in a predetermined direction with a directivity.

The transparent hologram screen may comprise a reflection- or transmission-type hologram. The hologram has a function of converting, with respect to a wavelength among spectra of indicator light, spherical wave light which divergently propagates from a position (e.g., a pupil position) of the image forming optical system or the vicinity thereof, into a spherical wave light which convergently propagates toward the eyes of an observer located in a space on the same or opposite side of the hologram with respect to the image forming optical system.

According to another embodiment, the hologram comprises a plurality of holograms which are multilayered or multi-recorded on a single photosensitive medium for diffracting, with respect to a wavelength among spectra of indicator light, spherical wave light which divergently propagates from a pupil position of the image forming optical system, toward a plurality of spots around the eyes of an observed located in a space on the same or opposite side of the hologram with respect to the image forming optical system.

The hologram preferably comprises a first hologram and a second hologram which are multilayered or multi-recorded on a single photosensitive medium layer. The first hologram converts, with respect to a wavelength among spectra of indicator light, spherical wave light which divergently propagates from a pupil position of the image forming optical system, into spherical wave light which convergently propagates toward a first spot located in a space on the same or opposite side of the hologram with respect to the image forming optical system. The second hologram converts, with respect to a wavelength among spectra of the indicator light, spherical wave light which divergently propagates from the pupil position of the image forming optical system, into spherical wave light which convergently propagates toward a second spot located in a space on the same side of the hologram as the image forming optical system exists. These first and second spots are selected by the left eye and right eye of an observer.

A wavelength band-pass filter for selectively transmitting light having a wavelength in a selected reflective wavelength width of the reflection-type hologram, or an optical path folding mirror having a wavelength selectivity may be interposed in an optical path between the reflection-type hologram and the indicator.

The image forming optical system may be provided with a variable aperture diaphragm.

According to another embodiment of the invention, the transparent hologram screen comprises a transparent curved substrate having a hologram, and the image forming optical system has a field curvature aberration for forming an image on the curved hologram screen according to a planar image provided by the indicator.

Note that the term "wavelength" as referred to herein defines a wavelength band having a certain width.

The transparent hologram enables a user to see a displayed image over a background image. The surface of the image combiner acts as an image emitting surface, like a display screen of a conventional display unit, so that a display screen of the display unit of the invention is aligned with the position whereat an image is actually displayed.

The hologram has the function of converting, with respect to a wavelength among spectrum of indicator light, spherical wave light which divergently propagates from the (pupil) position of the image forming optical system, into spherical wave which convergently propagates toward the eyes of an observer located in a space on the same or opposite side of the hologram with respect to the image forming system, and as a result, the observer can see a real image of an image provided by the indicator on the display screen of the image combiner (the reflection-type hologram or the transmission-type hologram).

The hologram forms an image at a plurality of spots around the eyes of the observer, so that the observer can clearly see the image in the observer's field of view even if the observer moves his or her eyes to some extent. The image forming positions are preferably selected by the left eye and right eye of the observer.

The wavelength land-pass filter or the optical path folding mirror having wavelength selectivity is disposed in the optical path between the reflection-type hologram and the indicator to selectively transmit light which is in a selected reflective wavelength width of the reflection-type hologram, and as a result, the color of, for example, an indicator light, is preferably selected.

By controlling the size of the variable aperture diaphragm arranged for the image forming optical system, a visible range of a displayed image can be easily controlled.

The invention is applicable to a curved hologram screen only by providing the image forming optical system with screen curvature aberration, as with this arrangement, a flat image provided by the indicator can form an image on the curved hologram screen.

BRIEF DESCRIPTION OF THE DRAWINGS

Other features of the present invention will become more apparent from the following description directed to preferred embodiments of the invention, with reference to the accompanying drawings, in which:

FIG. 1 is a view showing a basic concept of a display unit of the invention;

FIG. 2 is a diagram showing a shape of spectra of light emitted from an indicator incorporated in a display unit of the invention;

FIG. 20b is an enlarged view of one hologram element of a holographic screen shown in FIG. 20a;

FIGS. 21a, 21b and 21c are views showing three kinds of light waves reflected by a holographic screen shown in FIG. 20a;

FIG. 22a is a view showing a display unit employing a holographic screen shown in FIG. 20a;

FIG. 22b is an enlarged view of a holographic screen shown in FIG. 22a;

DESCRIPTION OF THE PREFERRED EMBODIMENTS

Figure 28:
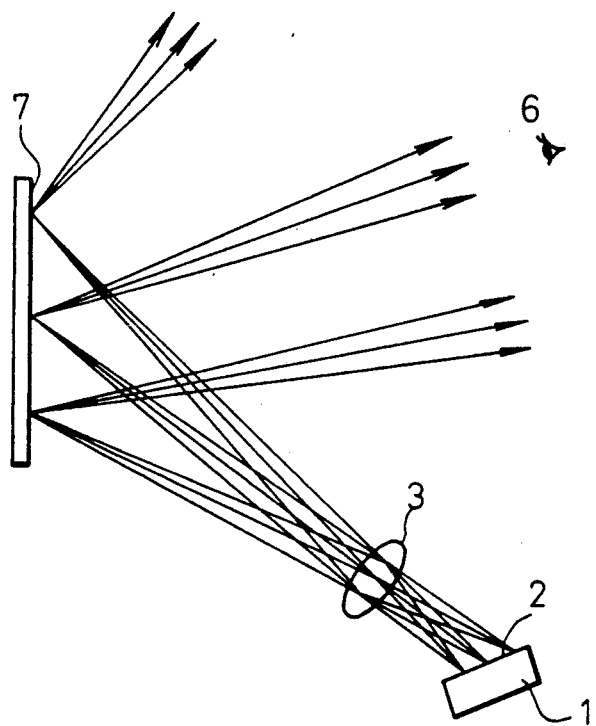
FIG. 28 is a view explaining a problem when a half mirror is used as an image combiner.
Figure 29:
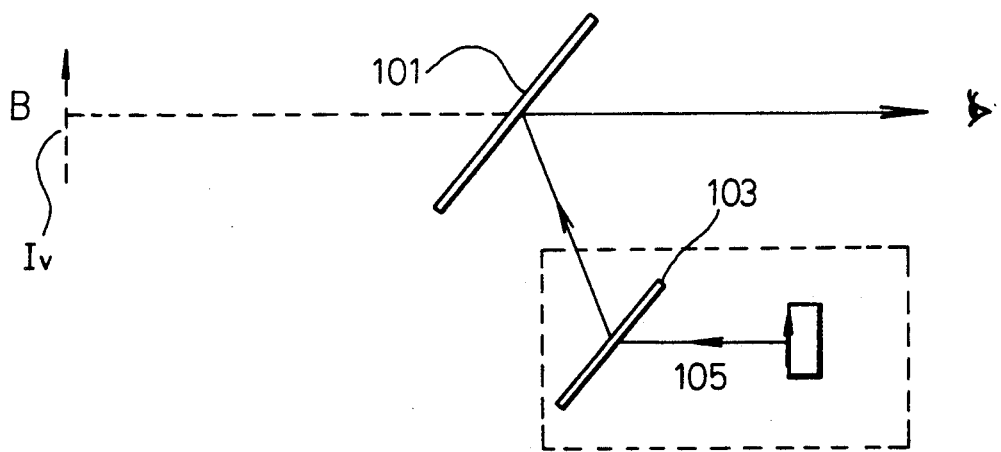
FIG. 29 is a view showing an example of a conventional head-up display.

FIG. 1 shows a display unit 5 according to an embodiment of the invention, wherein the transparent display unit is constituted by an indicator 1 forming an image on an indicator surface 2, and an image forming means (such as a lens) 3 forming an image on a transparent-type hologram (an image combiner) 4 according to the image provided by the indicator, whereby reflected and diffracted light 21 from the reflection-type hologram 4 is emitted toward a position 6 of an eye of a user. The reflection-type hologram 4 is fabricated such that spherical wave light diverging from a pupil position 22 (or around a center) of the image forming means 3 is converged toward the eye position 6, with respect to a center wavelength λc (FIG. 2) of a wavelength band of the indicator light. Note the converging rays are indicated with thick lines 23 in FIG. 1. Note, since a method of constructing the reflection-type hologram is known, an explanation thereof is omitted. Light from a point P on the indicator surface 2 forms a real image point Q on the surface of the reflection-type hologram 4 through the image forming means 3. The image point Q acts as a spot light source, and a divergent solid angle 106 of the light is substantially equal to a convergent solid angle Ω0 of light which is formed when the image forming means 3 forms the point Q. To expand a range of the eye position 6 at which the displayed image can be seen, an aperture of the image forming system must be enlarged accordingly (to be explained later). Light from all points on the indicator surface 2 overlap at the eye position 6, so that the entire displayed image can be seen. If the reflection-type hologram 4 is replaced with a half mirror 7 as shown in FIG. 28, it is not possible to see the entire displayed image (represented with an arrow mark in FIG. 1) at one time because the half mirror simply reflects the image such that each point of the real image does not always reach the eye position 6 of the user of the display unit. Namely, an optical element (such as the mirror) having a regular reflection function cannot realize the display unit having a wide view field.

Figure 3A:
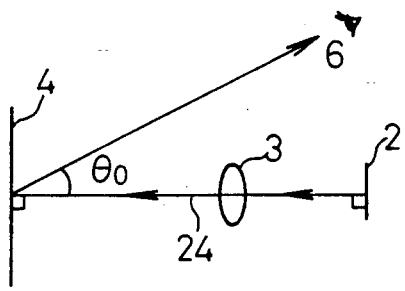
FIGS. 3a to 3c and FIGS. 4a to 4c are views showing different positional relationships between an indicator surface, an image forming means, and a hologram, of an image forming system of the invention.
Figure 3B:
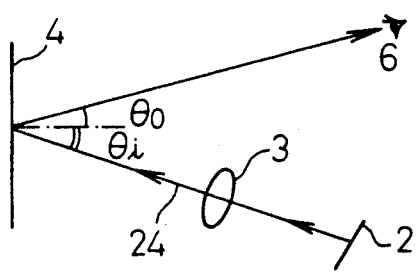
Figure 3C:
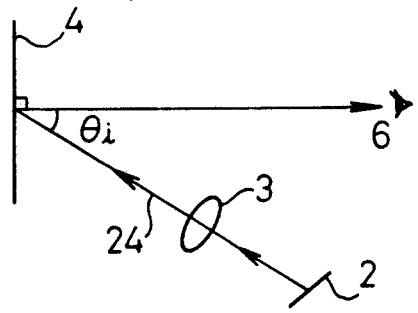

FIGS. 3a, 3b and 3c show variations of relative positions of the indicator surface 2, image forming means 3, reflection-type hologram 4, and eye position 6, according to the invention. In FIG. 3a, the indicator surface 2 and reflection-type hologram 4 are orthogonal to a direction 24 defined by connecting the centers of the indicator surface 2 and reflection-type hologram 4.

A user of the display unit obliquely (at an angle $\theta o$) observes a displayed image with respect to a normal of the reflection-type hologram 4 (the image combiner). In this arrangement, an apparent vertical size of a displayed image is $\cos\theta o$ times the size of a real image. This arrangement raises no problem in practical use because $\theta o = 37$ degrees, i.e., 0.8 times, for example.

In FIG. 3b, the reflection-type hologram 4 is tilted by $\theta i$ relative to the direction 24 to form a reflection direction of $\theta o$. Compared with FIG. 3a, this arrangement is advantageous in reducing $\theta o$. A reflected and diffracted direction from the reflection-type hologram 4 may coincide with a regular reflection direction on the surface thereof so that, when spectra of indicator light are wider than a wavelength selection range of the reflection-type hologram 4, the color and brightness of a displayed image may change.

In FIG. 3c, a user of the display unit orthogonally views the reflection-type hologram 4. This is preferable because the indicator surface 2 is vertical to a line of sight. The reflection-type hologram 4, however, is greatly inclined (angle $\theta i$) relative to the direction 24 so that this arrangement may be unreasonable as an image forming system.

These three positional relationships are selected depending on the configuration, usage, etc., of the display unit.

Figure 4A:
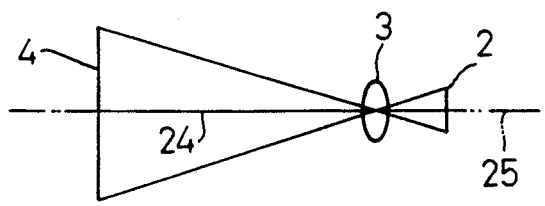
Figure 4B:
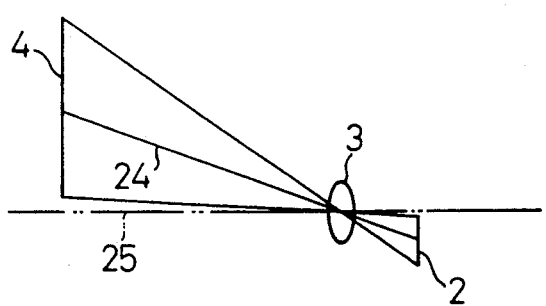
Figure 4C:
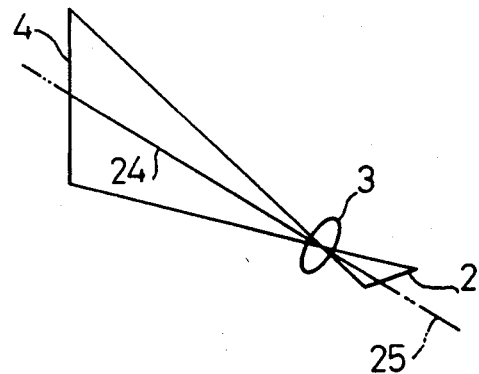

FIGS. 4a, 4b and 4c show examples of arrangements of the image forming system of the invention. FIG. 4a is a standard arrangement in which the indicator surface 2 and reflection-type hologram 4 (the image surface) are orthogonal to an optical axis 25 of the image forming means 3. This arrangement corresponds to FIG. 3a. FIGS. 4b and 4c correspond to FIGS. 3b and 3c, respectively. Similar to FIG. 4a, FIG. 4b shows the indicator surface 2 and reflection-type hologram 4 (the image surface) which are orthogonal to the optical axis 25 of the image forming means (the lens system) 3. FIG. 4b uses a location where the height of an image is large. To realize this arrangement, the lens system must have a wide view field. In FIG. 4c, the reflection-type hologram 4 (the image surface) is tilted relative to the optical axis 25 of the image forming means 3, and accordingly, the indicator surface 2 also must be tilted, and as a result, the image has a trapezoidal distortion. These three arrangements are selected depending on the quantity of distortion allowed for a displayed image, and the cost and application of the display unit.

Figure 5:
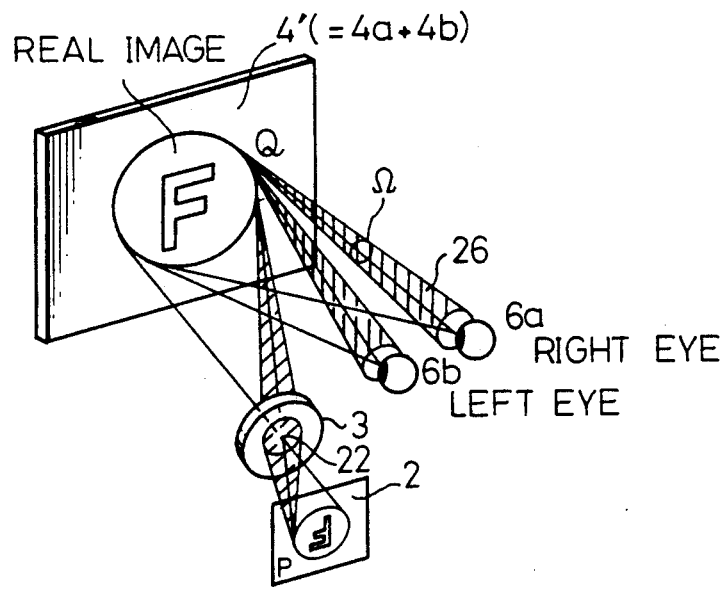
FIG. 5 is a view explaining a means for expanding a view range of a display unit of the invention.

FIG. 5 is an explanatory view showing an embodiment which enables an observer to see a displayed image with both eyes, or which expands an eye position range wherein the observer can see a displayed image. A point P on an indicator surface 2 forms a point Q on a reflection-type hologram 4, and the point Q diverges toward an eye position 6 at a solid angle Ω, as explained with reference to FIG. 1. When the displayed image is seen at a least distance of distinct vision (a short distance between the eyes and the image combiner, for example, 30 cm), and when a circular cone 26 formed by the divergent light must include both eyes, an aperture of an image forming means 3 must be large. The image forming means also must have a wide view field. These elements increase the cost of the image forming means. To use a low-cost lens system having a relatively simple structure for the image forming means 3, the lens system must have a capacity of sending indicator light to the eyes 6a and 6b even with a small aperture. This may ba easily achieved with a hologram 4' formed by overlaying a reflection-type hologram 4a and a reflection-type hologram 4b one upon another, or by multi-recording the holograms 4a and 4b. The hologram 4a converges spherical wave light diverging from a pupil position 22 of the image forming means 3 toward the right eye position 6a of the user of the display unit, while the hologram 4b converges the spherical wave light diverging from the pupil position 22 of the image forming means 3 toward the left eye position 6b of the user of the display unit. A method of forming the multi-recorded hologram is per se known. In this specification, "multi-recorded" means to form a plurality of holograms on a single recording medium layer, and "multilayer" means to laminate a plurality of recording medium layers each having a required hologram one upon another.

Figure 6:
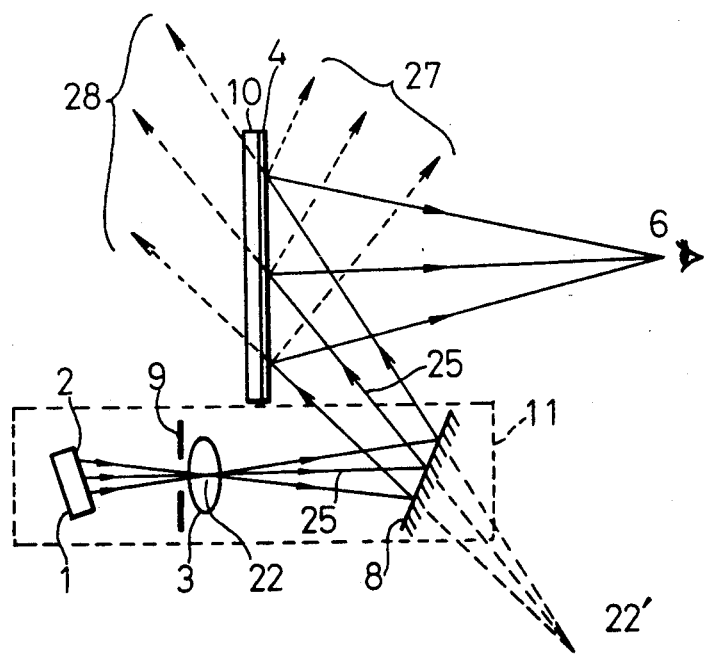
FIG. 6 is a view showing an arrangement of a display unit of the invention.

FIG. 6 shows another embodiment of the invention, wherein an image indicated on an indicator surface 2 of an indicator 1 passes through an image forming means 3 (for example, a lens system) and is reflected by a regular reflection mirror 8 to form an image on a vertically arranged reflection-type hologram 4 (an image combiner). The formed image is reflected and diffracted toward an eye 6 of a user of the display unit in a normal direction of the reflection-type hologram 4. The reason why an optical path is folded with the regular reflection mirror 8 is enable the indicator 1 and image forming means 3 to be horizontally arranged. The indicator surface 2 is tilted relative to an optical axis 25 of the image forming means 3, and this tilt causes a trapezoidal distortion on the real image on the image combiner, which distortion may be eliminated by distorting the displayed image into a reversed trapezoidal shape. The reflection-type hologram 4 is an off-axis reflection-type hologram having a function of converging spherical have diverging from a virtual image 22' at a pupil position 22 of the lens system 3 toward the eye position 6.

Figure 7:
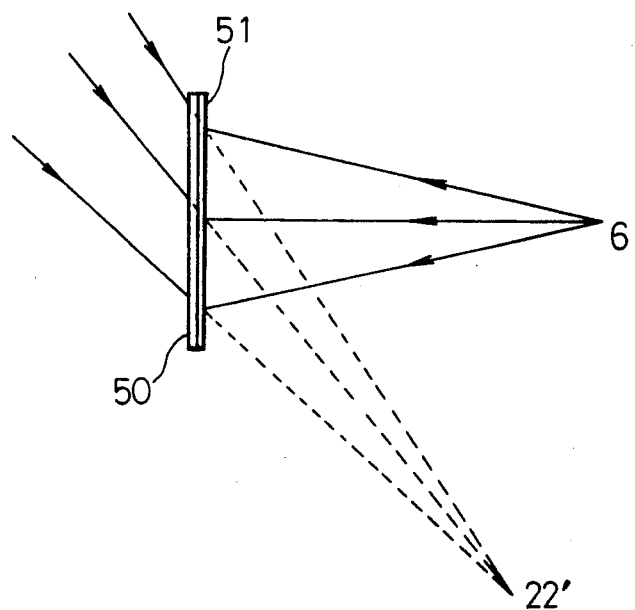
FIG. 7 is a view showing a method of constructing a reflection-type hologram employed in the invention.

FIG. 7 shows a method of preparing the hologram 4, wherein a coherent spherical wave diverging from a point 6 interferes with a spherical wave converging to a point 22' to form a hologram on a photosensitive material layer (a recording medium) 51 disposed on a substrate 50. In this method, a hologram forming wavelength is equal to a peak wavelength of indicator light. When the wavelength of the indicator light differs from the hologram forming wavelength, the difference in the wavelength must be considered when designing wave fronts of the two light fluxes so that they interfere. This designing method is known, and thus will not be explained. The hologram is processed according to conventional sequences used when preparing a volume-type hologram. In FIG. 6, light which has been reflected and diffracted by the reflection-type hologram 4 acts as if the surface of the hologram is a light emitting surface. The light from the hologram 4, however, has a strong directivity, unlike that of a conventional emission-type display unit, and all of the reflected light is propagated to the vicinity of the eye position 6 of the user of the display unit, to thus show a bright image.

Regularly reflected light 27 (indicated with dotted lines in FIG. 6) from the surface of the reflection-type hologram 4 may be removed by making the hologram off axis. The reflection-type hologram has a wavelength selectivity such that the light actually used for displaying an image is limited to that having a wavelength band selected by the hologram from among emission spectra of the indicator 1. The emission spectra of the indicator are generally wider than a wavelength selection width of the hologram, and thus light having a wavelength outside the wavelength selection width transits the hologram (transmitted light 28). When the display unit is transparent, and the user does not want a stranger behind the image combiner seeing the displayed images, the transmitted light 28 must be made to vanish. One way of accomplishing this is to replace the optical path folding mirror 8, which may be a simple aluminum deposited mirror, with, for example, a regular-reflection-type hologram and a multilayered film mirror having the same wavelength selectivity as that of the hologram combiner. This arrangement can remove in advance light having a wavelength band which is not reflected by the image combiner.

FIG. 6 is a side view, and thus only one eye is shown in the figure. To guide indicator light toward the left eye and the right eye, holograms may be multilayered or multi-recorded as explained before (FIG. 5). The restrictions on the eye position 6 can be relaxed if the aperture of the image forming means 3 is enlarged, and thus an adjustable aperture diaphragm 9 can be arranged in the vicinity of the pupil position 22 of the image forming means 3, to thereby change a spatial limit of the eye position 6.

Figure 8:
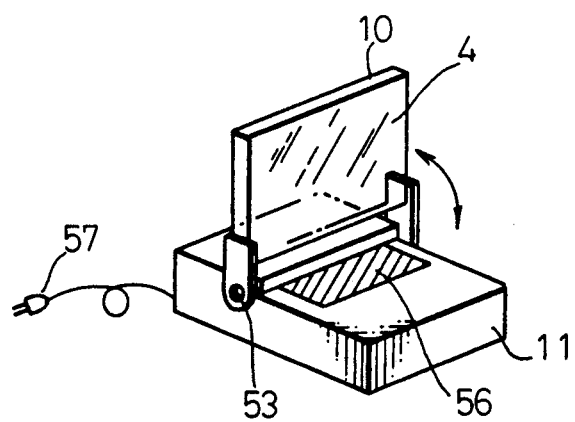
FIG. 8 is a view showing an exterior of a display unit of the invention.

FIG. 8 is an external view showing an example of a display unit according to the invention. A reflection-type hologram 4 is formed on a transparent plate (an image combiner) 1), which is orthogonal to the unit 11 (FIG. 6) including the indicator 1, image forming means 3, and mirror 8. When the display unit is not used, the transparent plate is turned by 90 degrees through a rotary mechanism (for example, the image combiner may be rotatably supported with a pin 53) to be horizontal with respect to the surface of the unit.

Numeral 56 denotes a projection window, and 57 a power source cable. The embodiment of FIG. 8 is based on the arrangement of FIG. 3c, but of course can be also based on the arrangement of FIG. 3a or 3b.

Figure 9:
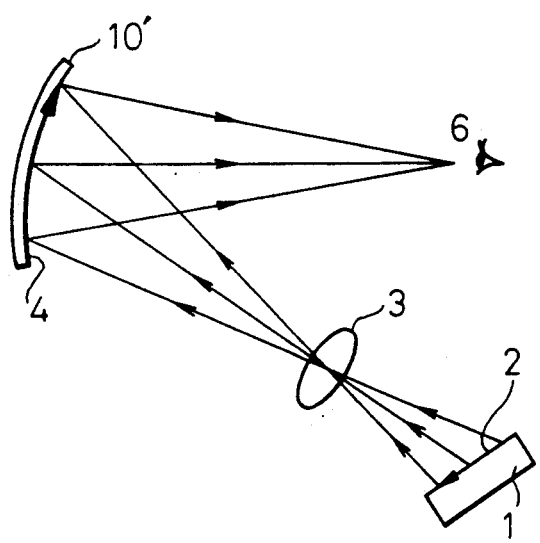
FIG. 9 is a modification of an image forming system of the invention.

FIG. 9 shows still another embodiment of the invention. Instead of the flat image combiner 10, this embodiment employs a curved surface 10' with an image forming means 3 having image face curving characteristics, i.e., an image face curving aberration. With this arrangement, a real image on an indicator surface 2 can be made to substantially agree with the surface of a reflection-type hologram 4 on the curved substrate 10'

Figure 10:
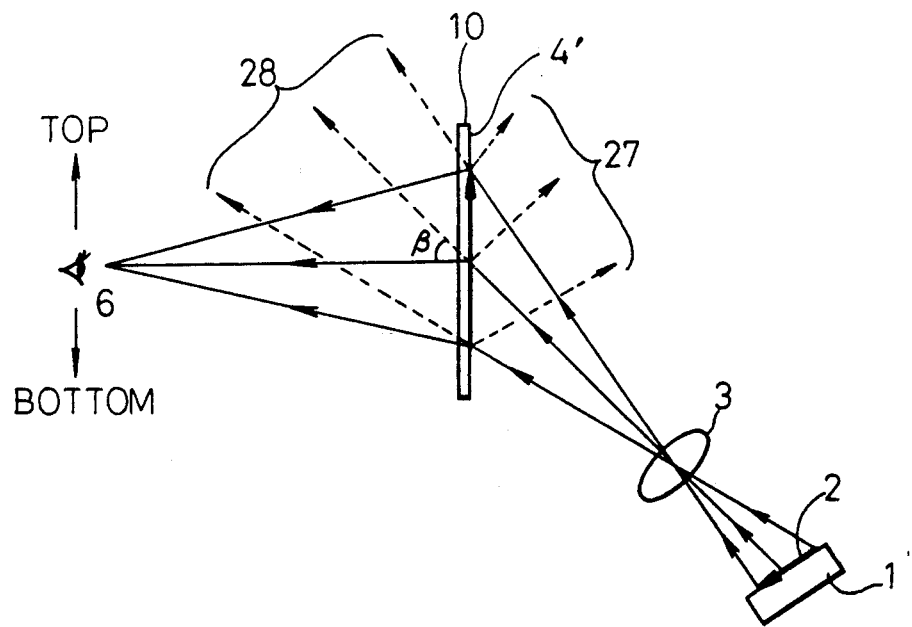
FIG. 10 is a view showing an embodiment of the invention employing a transmission-type hologram.

In FIG. 10, an image combiner 10 comprises a transmission-type hologram 4' instead of the reflection-type hologram. Arrangements for forming a real image on the surface of the transmission-type hologram 4' according to an image indicated on an indicator surface 2 are the same as those of FIG. 1. The real image is diffracted, however, toward an eye position 6 of a user of the display unit, located on the opposite side of the image combiner with respect to the image forming system. The transmission-type hologram 4' also may be made by multi-recording a plurality of holograms, so that a displayed image may be made incident on the left eye and the right eye of the user. If it is required to block regularly reflected light 27 on the surface of the image combiner, a reflection preventive film may be applied over the transparent plate, and thus light which is not diffracted by the transmission-type hologram 4' will not catch the eyes if a deflection angle $\beta$ of the hologram is large. The wavelength selectivity of the transmission-type hologram 4' is weak, so that the color of a displayed image may change depending on the positions of the eyes. When the eyes are moved from top to bottom, the color of a displayed image changes from blue to green to yellow, and is read in this order (when the indicator provides a white indication).

In this way, the present invention can realize the arrangements of FIGS. 1 through 9 with the same configuration but using the transmission-type hologram.

The reflection-type hologram selectively reflects light having a narrow wavelength band (20 to 30 nm), and this why an image combiner made of a piece of the reflection-type hologram provides a monochrome image. An image with more than two colors can be realized with a hologram made by laminating or multi-recording a plurality of reflection-type holograms which reflect light having different wavelength bands.

Figure 11:
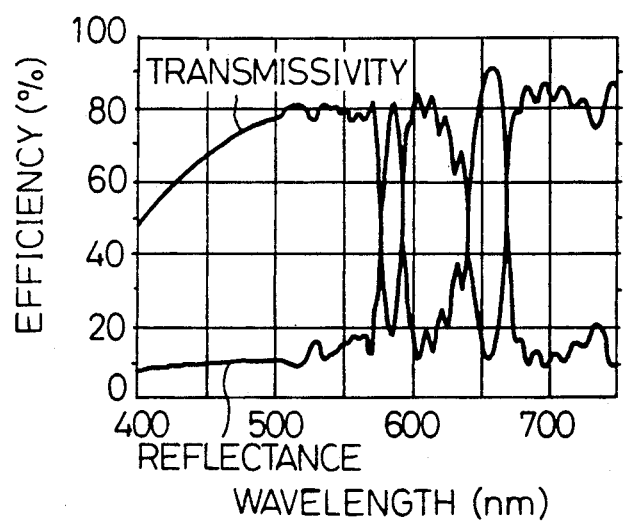
FIG. 11 is a characteristic diagram of a hologram for displaying an image with two colors according to an embodiment of the invention.

For example, to realize a transparent display unit which can display an image with yellow and red colors with the arrangement of FIG. 1, it is possible to employ a multi-recorded reflection-type hologram having the wavelength selecting reflection characteristics as shown in FIG. 11. In this case, the multi-recorded reflection-type hologram is fabricated to have a function of converting spherical wave light diverging from the pupil position 22 of the image forming means 3 into spherical wave light converging toward the eye position 6 of the user of the display unit, with respect to wavelengths of 585 nm and 660 nm. Instead of multi-recording the two reflection-type holograms, the same function will be obtained by preparing the two holograms separately, and then adhering them together face to face.

Figure 12:
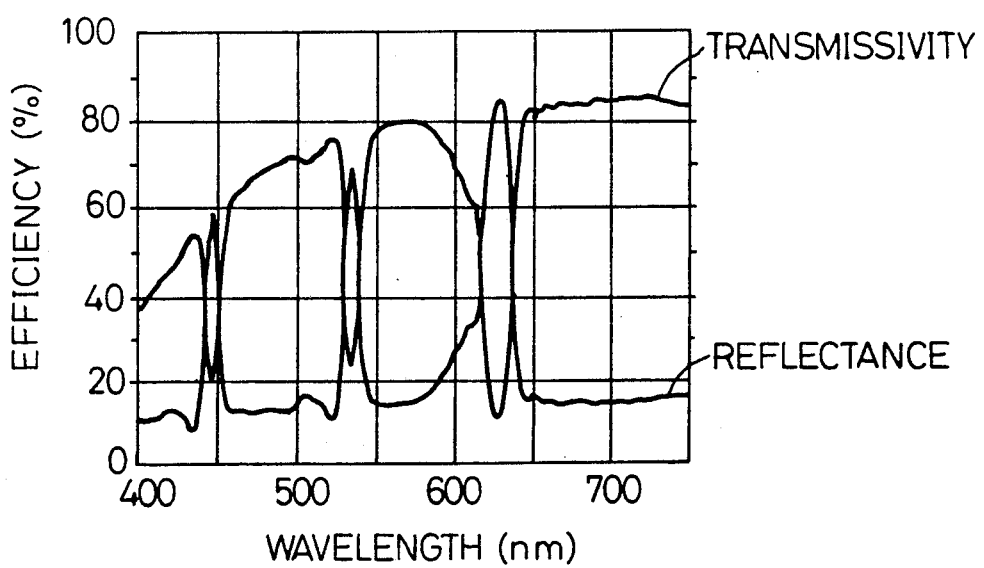
FIG. 12 is a characteristic diagram of a hologram for displaying an image with three colors according to an embodiment of the invention.

To display an image with three colors, three holograms are multi-recorded or multilayered. For example, a multi-recorded reflection-type hologram having wavelength selecting reflection characteristics shown in FIG. 12 is used. In this case, the multi-recorded reflection-type hologram is fabricated to present a function of converting spherical wave light diverging from the pupil position 22 of the image forming means 3 into spherical wave light converging toward the eye position 6 of the user of the display unit, with respect to wavelengths of 445 nm (blue), 530 nm (green), and 680 nm (red). Note, instead of the above multi-recording three reflection-type holograms, these may be prepared separately and adhered together. For example, two holograms are multi-recorded and adhered with a singularly recorded hologram such that the media thereof face each other. If the three holograms are prepared separately and adhered to one another, at least one substrate is held between hologram layers, and this may cause a large positional deviation (of the order of millimeters) for the thickness of the substrate. As a result, a real image on the indicator surface may not be simultaneously formed on the three layers of hologram faces, which causes a loss of visibility.

As explained above, a real image is formed on the surface of a hologram of an image combiner according to an image provided by an indicator. The hologram diffracts the real image toward the eyes of a user of a display unit. The display unit is transparent and is a non-virtual (real) image type similar to a conventional display unit. The use of the transparent display unit of the invention enables a displayed image and a background to be observed simultaneously.

By multi-recording or laminating holograms, a range of eye positions whereat a displayed image is seen can be expanded, and an image may be displayed with many colors.

A hologram element has a wavelength divergence and thus is usually combined with a hologram for cancelling any chromatic aberration. This arrangement of the invention provides an advantage of forming a real image on the surface of a hologram, and thus no aberration occurs even if a difference in wavelengths causes the deflection directions to differ from one another.

The reflection-type hologram 4' (4a, 4b) of the display unit of FIG. 5 usually has a narrow reflective wavelength band ranging, for example, from 20 to 30 nm, as can be seen in FIGS. 11 and 12, and when combined with a usual indicator having an emissive wavelength band of about 70 nm or greater, the use efficiency of light is lowered. Accordingly, a simple solution is to use an indicator having a high brightness, but an indicator having a high brightness and employing a special phosphorescent material, to thereby realize a narrow emissive wavelength band, is expensive. To this end, the following several embodiments (FIGS. 13 –19b) realize a display unit which can improve the brightness of a displayed image with a conventional indicator having a usual spectra and brightness, without employing such a special indicator.

In a display unit of these embodiments, the reflection-type hologram 13 corresponding to the reflection-type hologram 4' in FIG. 5 reflects light having a wavelength band around a wavelength $\lambda 1$, toward the position of one eye 6a of the user, while reflecting light having a wavelength band around a wavelength $\lambda 2$, which is different from the wavelength $\lambda 1$, toward the other eye 16b of the user, so that the user can see the image composed of the light of different wavelength bands through the left eye and the right eye.

The reflection-type hologram 13 is made by multi-recording or laminating reflection-type holograms 13a and 13b for reflecting light of two or more different wavelength bands, thereby expanding a reflective wavelength band of the reflection-type hologram 13, improving the use efficiency of the indicator light, and increasing the brightness of a displayed image, and thus even with a bright background, a displayed image overlapping the background is clearly visible. A stereoscopic vision may be realized by employing two reflective wavelength bands which greatly differ from each other, and by including parallax information in displayed images for the respective wavelength bands.

Figure 13:
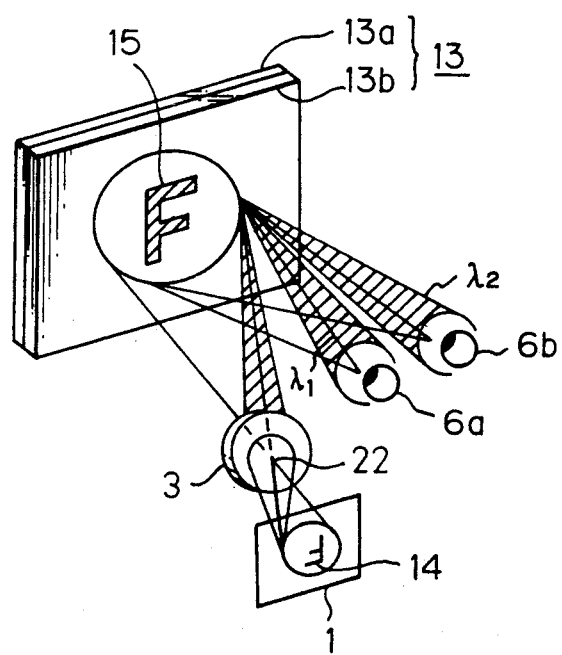
FIG. 13 is a view showing another embodiment of the invention.

In FIG. 13, which relates to a monochromatic display unit, numeral 1 is an indicator, 3 an image forming means employing lenses, etc. and 13 a reflection-type hologram disposed at a position where an image 14 on the indicator 1 forms a real image 15 through the image forming means 3. The hologram comprises a first reflection-type hologram 13a having a reflective wavelength band with a peak wavelength λ1 (hereinafter referred to as λ1) and a second reflection-type hologram 13b having a reflective wavelength band with a peak wavelength λ2 (hereinafter referred to as λ2). These holograms are adhered together to face each other.

Figure 14:
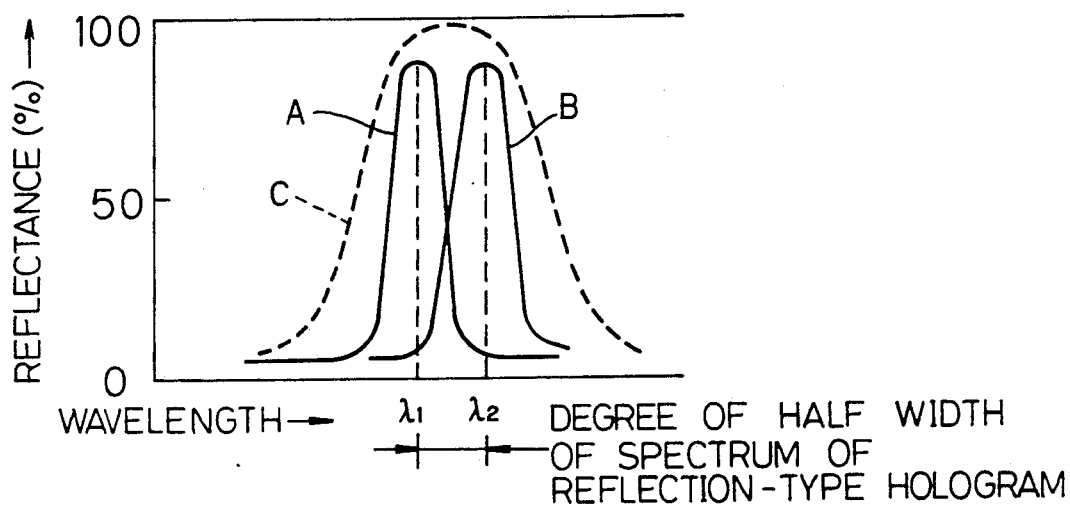
FIG. 14 is a view showing a selected example of a reflective wavelength band of a reflection-type hologram according to the embodiment shown in FIG. 13.

As shown in FIG. 14, the wavelengths λ1 and λ2 are set to differ from each other by about a half width of a reflective wavelength band of the reflection-type hologram within light emission spectra (indicated with a curve C) of the indicator. If a full width at half maximum is about 30 nm, they may be λ1=515 nm and λ2=545 nm. Curves A and B indicate spectra of the reflection-type holograms 13a and 13b, respectively. As shown in FIG. 13, the first reflection-type hologram 13a is fabricated to focus spherical wave light diversing from a principal point (pupil) 22 of the image forming means 3 at the position of a left eye 6a, while the reflection-type hologram 13b is fabricated to focus the spherical wave light diverging from the principal point 22 of the image forming means 3 at the position of a right eye 6b.

According to the embodiment of the above arrangement, the indicator 1 provides the image 14, which forms the real image 15 on the reflection-type hologram 13 through the image forming means 3. Among the indicator lights reflected by the reflection-type hologram 13, λ1 is mainly reflected toward the position of the left eye 6a of the user of the display unit while λ2 is mainly reflected toward the position of the right eye 6b, so that the user can see the displayed image.

Unlike the conventional technique which distributes the light of a single wavelength band to the left eye and the right eye, the embodiment allocates light of a single wavelength band to each of the left eye and the right eye, thereby increasing the brightness of a displayed image. The left eye and the right eye sense different colors from a displayed image; for example, a difference of 30 nm in wavelength allows a recognition of a difference in color. Namely, 515 nm (yellow green) can be distinguished from 545 nm (yellowish yellow green). When seeing a monochromatic image with both eyes, a substantial problem arises even if a slight difference in color occurs in images for the left eye and the right eye. Light having a wavelength between λ1 and λ2 is reflected by both the reflection-type holograms 13a and 13b but does not cause a double image because a real image is on the surfaces of the holograms.

According to the embodiment shown in FIG. 13, the holograms for λ1 and λ2 are separately prepared and adhered together. The first reflection-type hologram 13a and second reflection-type hologram 13b may be multi-recorded on a single hologram to provide the same function.

Figure 15:
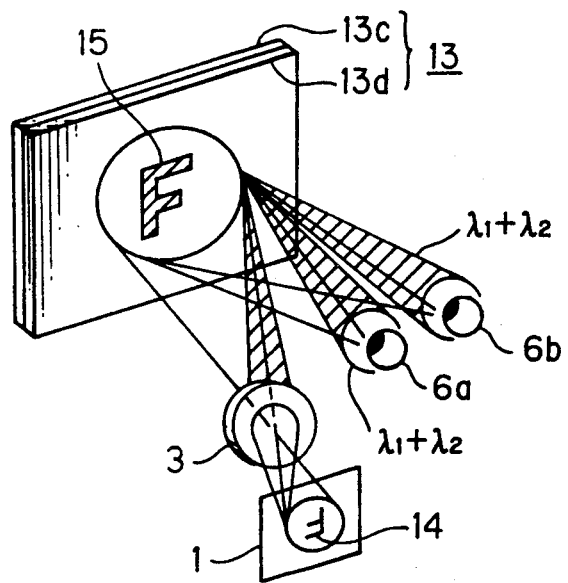
FIG. 15 is a view showing a modified embodiment of FIG. 13.

FIG. 15 shows another embodiment of FIG. 13. In this figure, the same parts as those shown in FIG. 13 are represented with like numerals.

A difference of this embodiment from the previous embodiment is that the first and second reflection-type holograms 13a and 13b for constituting the reflection-type hologram 13 are replaced with multi-recorded holograms 13c and 13d. Namely, a reflection-type hologram 13c acting on the wavelength λ1 and a reflection-type hologram 13c acting on the wavelength λ2 are multi-recorded (doubled) to face each other, thereby forming the reflection-type hologram 13. The λ1 and λ2 are selected in the same manner as in the first embodiment.

According to this embodiment, a mixture of colors of λ1 and λ2 can be seen with the left eye and the right eye, so that the eyes do not sense a color difference. This embodiment can improve the brightness similar to the embodiment of FIG. 13. This embodiment forms the reflection-type hologram 13 with the two reflection-type holograms 13c and 13d. It is possible to use three or more holograms to reflect light of more than three wavelength bands toward the left eye and the right eye of a user or toward a plurality of positions around the eyes, so that the user can see an image with a mixture of colors of more than three wavelength bands.

Figure 16:
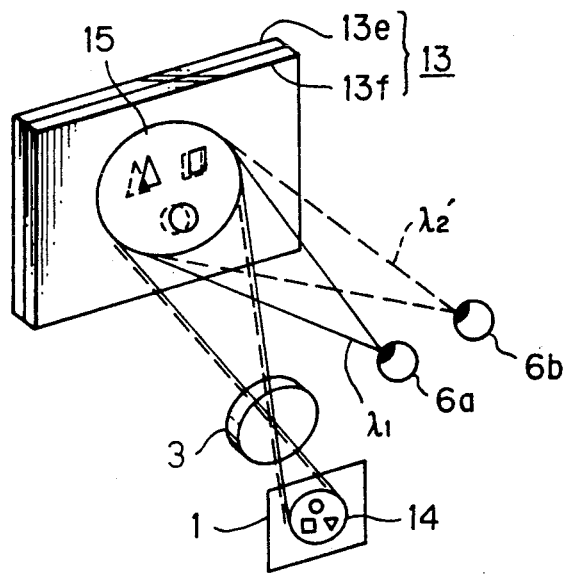
FIG. 16 is a view showing a still another embodiment of FIG. 13.

FIG. 16 shows a modified embodiment of FIG. 15. In this figure, the same parts as those in FIG. 13 are represented with like reference marks.

A difference of this embodiment from the embodiment of FIG. 1 is that the first and second reflection-type hologram 13a and 13b for constituting the reflection-type hologram 13 are replaced with first and second reflection-type holograms 13e and 13f for selectively reflecting wavelengths λ1 and λ2' which greatly differ from a reflective wavelength band width of the reflection-type hologram 13. The two holograms are adhered together to form a two-layer structure, or multi-recorded on a single layer hologram medium, in forming the reflection-type hologram 13. An indicator 1 provides an image (λ1) which is reflected only by the first reflection-type hologram 13e, as well as an image (λ2') which is reflected only by the second reflection-type hologram 13f.

Figure 17:
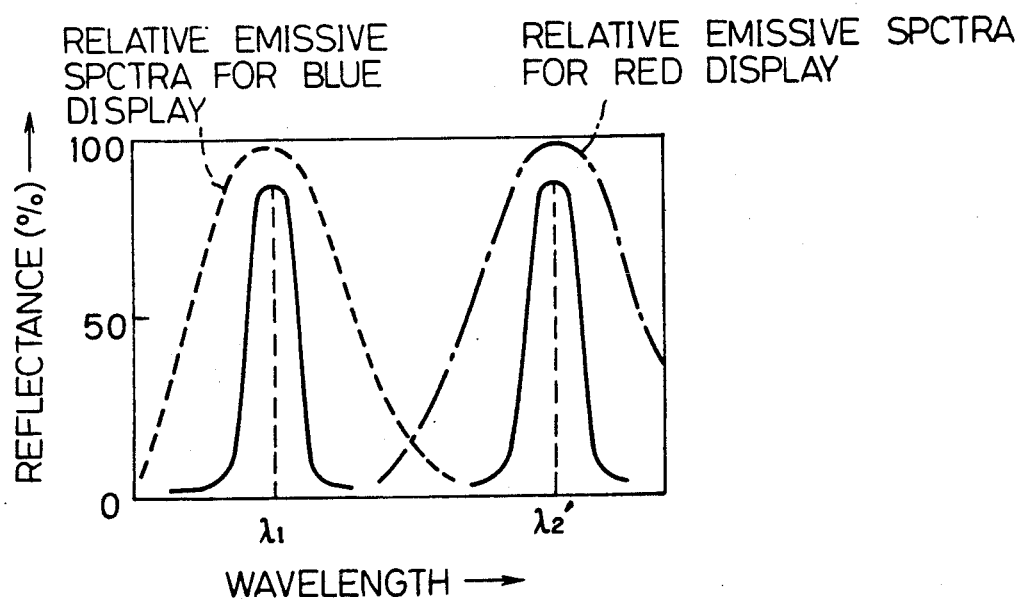
FIG. 17 is a view showing a selected example of a reflective wavelength band of a reflection-type hologram according to the embodiment shown in FIG. 16.

This embodiment of the above arrangement utilizes a parallax to provide a stereoscopic display image. Namely, images represented by λ1 and λ2' for the left eye and the right eye, respectively, include parallax information. Namely λ1 is seen only with the left eye 6a, and λ2' seen only with the right eye 6b, to thereby obtain a stereoscopic view due to the parallax. FIG. 17 shows selected examples of λ1 and λ2'. When λ1 is in a region of blue and λ2' in a region of red as shown in the figure, a stereoscopic view is seen as if red-blue 3D glasses are worn. This embodiment enables a user to see a background through the hologram without the use of the red-blue 3D glasses.

Figure 18A:
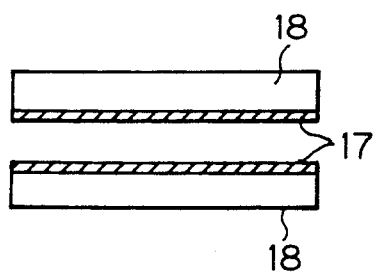
FIGS. 18a and 18b are views showing a method of adhering two holograms together according to an embodiment of the invention.
Figure 18B:
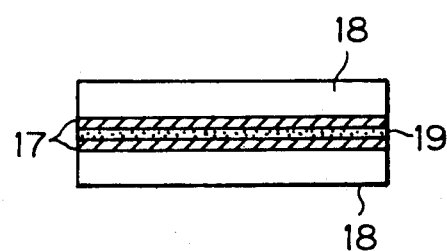

When a plurality of holograms are adhered together to form a multilayered structure in each of the above embodiments, the smaller the intervals between the holograms, the better. This is because, if the intervals between the holograms are large, the positions of surfaces on which a real image is formed differ from one another to produce a double image. To adhere two layers of holograms to each other, two substrates 18 each having a hologram 17 are employed as shown in FIG. 18a. The holograms are arranged to face each other and adhered together with optical adhesives 19 as shown in FIG. 18b. The thickness of the adhesive layer is usually suppressed to less than several tens micrometers, to avoid the formation of a double image.

Figure 19A:
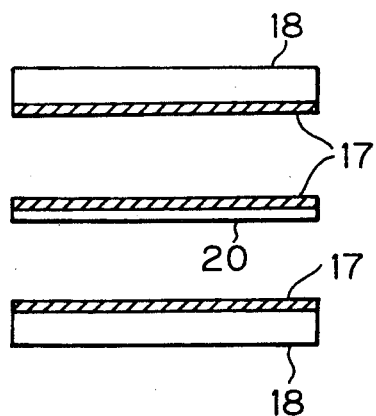
FIGS. 19a and 19b are views showing a method of adhering three or more holograms together according to an embodiment of the invention.
Figure 19B:
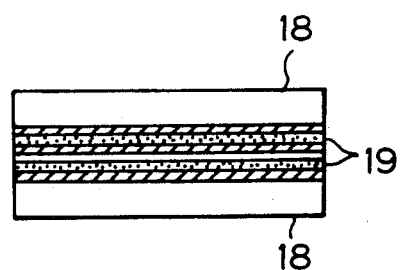

To adhere three or more layers of holograms together, each side hologram is made from, for example, a glass plate several millimeters thick on which a hologram 17 is formed as shown in FIG. 19a. An intermediate hologram is made from a thin transparent sheet 20 on which a hologram 17 is formed. These holograms are adhered together with optical adhesives 19 as shown in FIG. 19b. This arrangement can reduce the total thickness of the substrates and holograms.

According to the embodiments shown in FIGS. 13 through 19b, an image on an indicator passes through an image forming system and forms an image on the surface of a reflection-type hologram, which reflects and focuses the image at the positions of the eyes of a user of a display unit, so that the user can see the displayed image and a background simultaneously. The hologram is made by double-recording or laminating holograms that reflect light having two different wavelength bands. The two reflection-type holograms are fabricated to focus light separately at the positions of the left eye and the right eye of the user of the indicator, thereby improving the brightness of a displayed image. The two reflective wavelength bands may greatly differ from each other to produce images containing parallax information, thereby providing the user with a stereoscopic view. Reflection-type holograms having different reflective wavelength bands may be multi-recorded or laminated to form a multilayer structure, which focuses indicator light at a plurality of points around the positions of the eyes of a user. This arrangement improves the brightness of a displayed image.

The embodiments naturally maintain the advantage that displayed and background images can be simultaneously seen.

Although the visual area can be expanded with the method of FIG. 5, as mentioned above, a displayed image sometimes may be caught by only one eye of the user, if indicator light reflected by the hologram 4' is spatially separated and if the head of the user is moved left and right or back and forth (in the direction of propagation of the indicator light). An aperture of an image forming lens 3 may be enlarged to eliminate the spatial separation of the indicator light emitted toward the left eye and the right eye of the user, and reduce the chance of the user seeing the displayed image with only one eye. Note, this may cause a change in the brightness of the displayed image.

Figure 26:
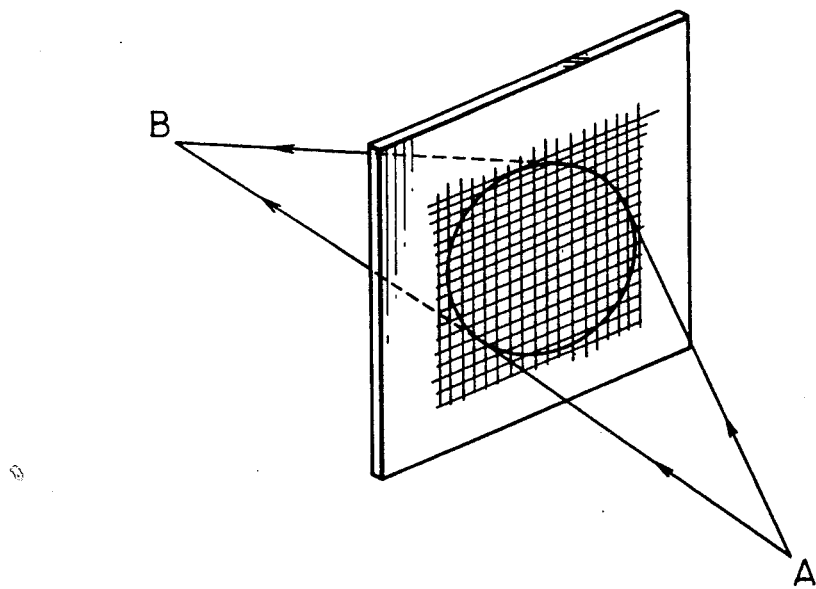
FIG. 26 is a view of a transmission type GRIN lens array.
Figure 27A:
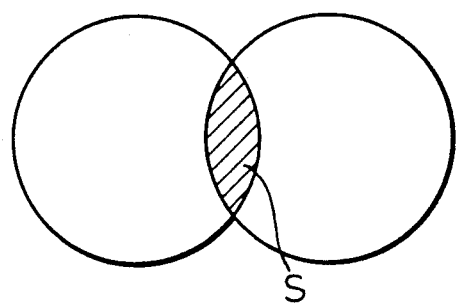
FIG. 27a and 27b are views showing two partially overlapping visual areas and two visual areas without an overlapping portion.
Figure 27B:
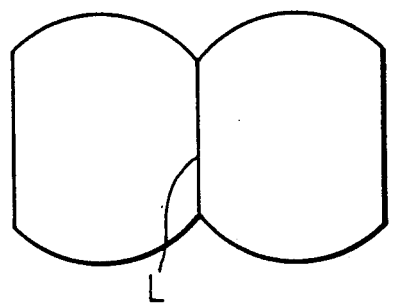

FIG. 27a shows an area (a visual area) in which a displayed image can be seen. When the eyes are located in a hatched areas, the brightness of the displayed image becomes about twice the brightness of other areas. When the user moves his or her head to the left or right while seeing the displayed image, the brightness of the displayed image flickers. If the brightness of the displayed image changes depending on the position of the eyes, the user may be fatigued and suffer inconvenience when using the display unit. The image forming lens system may have a rectangular mask to join visual areas together as shown in FIG. 27b. This may eliminate brightness unevenness but cannot remove a boundary (discontinuous line L). The following embodiments shown in FIGS. 20a to 26 realize an expansion of a visual area without producing a discontinuous line.

Figure 20A:
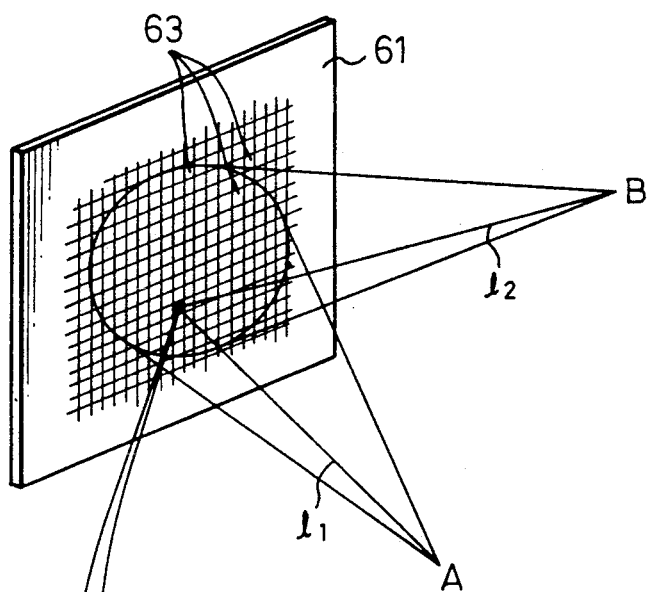
FIG. 20a is a view showing a holographic screen according to an embodiment of the invention.

According to an embodiment shown in FIG. 20a, there is provided a holographic screen 61 for diffracting a real image comprises hologram elements which are two-dimensionally arrayed to change a divergent or convergent solid angle of an incident light wave. Each of the hologram elements satisfies a Bragg condition with respect to light having a predetermined wavelength band. The hologram elements are so arranged that incident light of the hologram elements passes through a predetermined point A or a narrow space including the point A while outgoing light thereof passes through a predetermined point B or a narrow space including the point B.

With this arrangement, a spot on an image on the indicator forms a real image through the image forming lens system. At this time, the focal length and aperture of the lens system determine the solid angle of a focusing beam, which is enlarged due to diffraction at the hologram elements, and as a result, a discontinuous boundary is not formed and a visual area can be expanded.

Figure 20B:
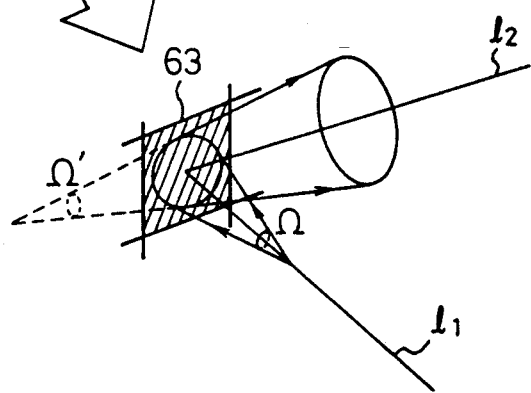

FIGS. 20a and 20b show an example of the arrangement and function of a holographic screen of the present invention, in which FIG. 20a is a general view showing the holographic screen 61 comprising two-dimensionally arrayed hologram elements for changing the solid angle of a divergent or convergent wave and reflecting the wave. The hologram shown is a model, so that grid lines appear, but actually the hologram (holographic screen 61) is transparent. FIG. 20b is an enlarged view showing one of the hologram elements 63. With respect to light having a predetermined wavelength band, the hologram element 63 reflects divergent light having a solid angle of $\Omega$ and changes the solid angle to $\Omega'$. If $\Omega' > \Omega$, a divergent angle of the light increases. As shown in FIG. 20a, an optical axis 11 of incident light of the hologram element passes through a point A, while an optical axis 12 of outgoing light of the hologram element passes through a point B. All of the hologram elements 63 are fabricated such that the incident and outgoing optical axes thereof pass through the points A and B, respectively. It must be noted that little problem arises even if the optical axes do not pass precisely through the points A and B but in the vicinity thereof.

Figure 21A:
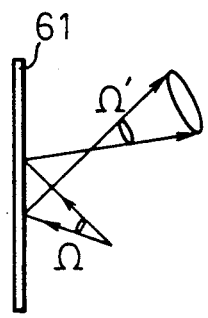
Figure 21B:
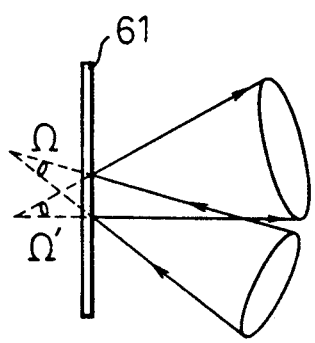
Figure 21C:
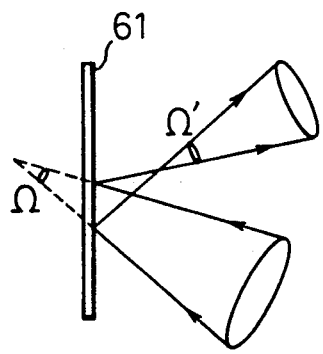

In FIG. 20a, a divergent wave is reflected. The arrangement of FIG. 23a is also effective if a divergent wave converges after reflection as shown in FIG. 21a, or if a convergent wave diverges after reflection as shown in FIG. 21b, or if a convergent wave is reflected as shown in FIG. 21c. In FIG. 20a, each hologram element 63 has a rectangular shape, but the shape is not necessarily rectangular, and boundaries between the hologram elements 63 are not necessarily distinctive.

Figure 22A:
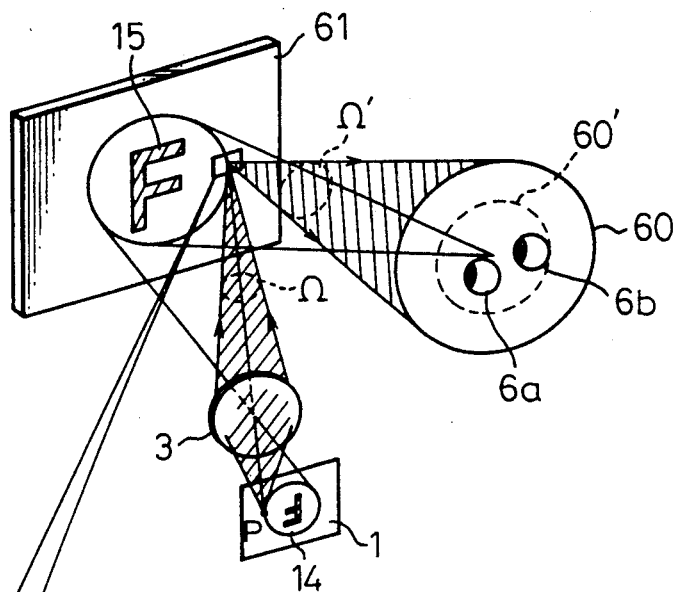
Figure 22B:
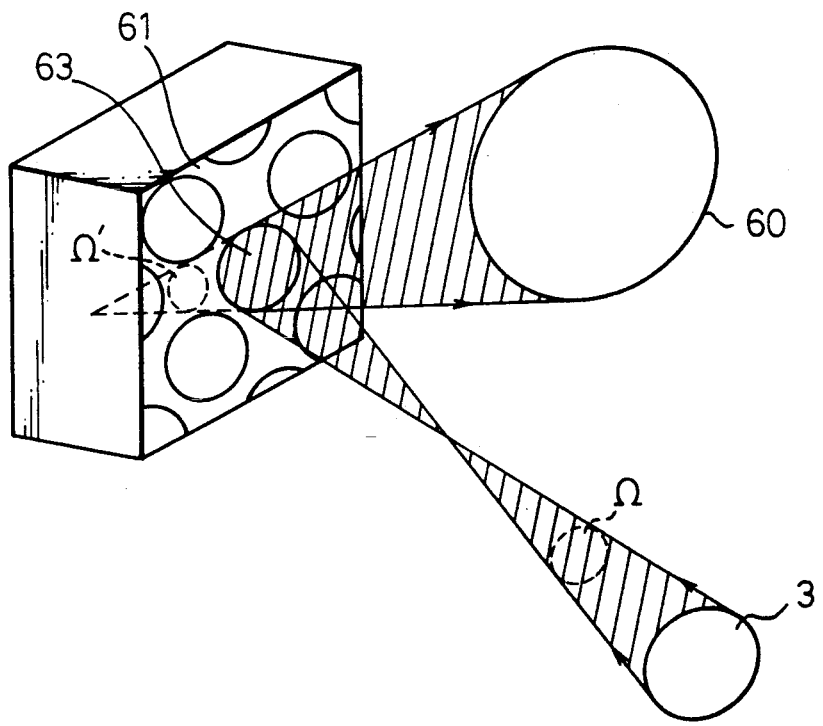

FIGS. 22a, 22b show an optical system of a display unit employing the holographic screen 61 shown in FIG. 20a, in which FIG. 22a is a general view, and FIG. 22b an enlarged view of the holographic screen. Note that the reflection type hologram elements 63 are small and circular rather than a grid. In FIG. 22a, an image 14 on an indicator 1 passes through an image forming lens 3 and forms a real image 15 on the surface of a holographic screen 61. Each point on the real image diverges and propagates toward an intermediate point between left and right eyes 6a and 6b of a user of this display unit. The holographic screen 61 is fabricated such that the points A and B of FIG. 20a coincide with the center of an exit pupil of the image forming lens and the intermediate point between the left and right eyes 6a and 6b, respectively. A point P on the image 14 on the indicator 1 forms an envelope of light flux as indicated with hatched portions in FIGS. 22a and 22b. A convergent solid angle $\Omega$ formed by the image forming lens 3 changes to $\Omega'$ ($>\Omega$) after reflection by the holographic screen 61, thereby expanding a visual area of FIG. 5 (indicated with a dotted line 60' in FIG. 22a) to a visual area 60.

Figure 23:
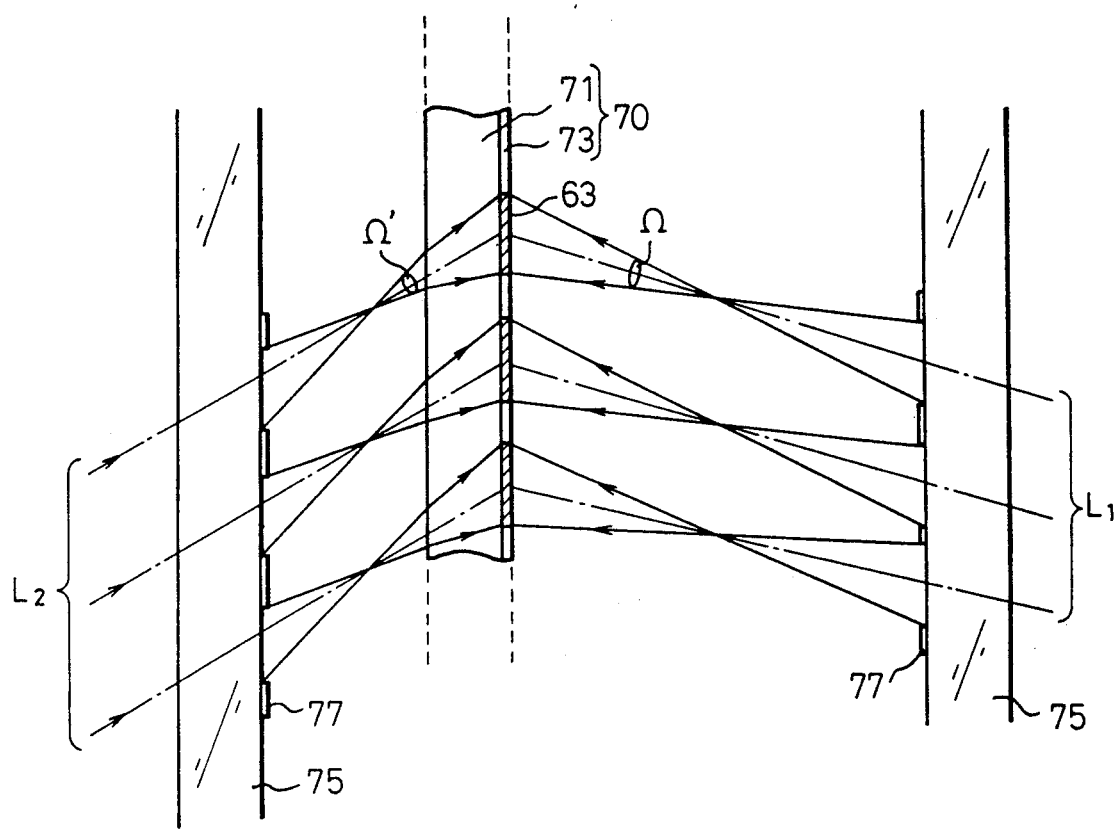
FIG. 23 is a view showing a method of constructing a holographic screen according to an embodiment of the invention.

FIG. 23 shows a method of forming the holographic screen 61, as shown in FIGS. 22a and 22b. A hologram recording medium 73 is disposed on one side of a transparent substrate 71, thereby preparing a holographic plate 70. Coherent light rays $L_1$ and $L_2$ irradiate each side of the holographic plate 70, which is developed to form a reflection-type hologram. Coherent light $L_1$ for irradiating one side of the holographic plate 70 is a divergent spherical wave, which passes through a distributed index lens array plate 75 disposed in the vicinity of the holographic plate 70 and irradiates the holographic plate. Coherent light $L_2$ for irradiating the other side of the holographic plate is a convergent spherical wave, which passes through another distributed index lens array plate 75 disposed in the vicinity of the holographic plate 70 and irradiates the holographic plate. It is preferable to arrange masks 77 on the surfaces of the distributed index lens array plates 75, to cut unnecessary noise light. By controlling the relative positions of the two distributed index lens array plates 75 and by irradiating the holographic plate with divergent waves from each side, reflection-type hologram lenses will be two-dimensionally arrayed. The size of each reflection-type hologram lens (a hologram element), which corresponds to each display pixel, is, for example, several hundreds of micrometers.

Figure 24:
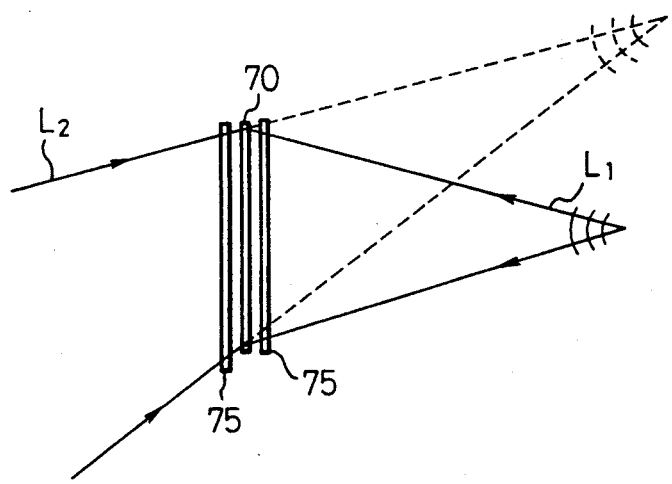
FIG. 24 is a view showing a basic concept of a method of constructing a holographic screen shown in FIG. 23.

FIG. 24 is a reduced view showing the holographic screen forming system. The position of divergence of the divergent wave is determined according to the center of an exit pupil of an image forming lens 3 of a display unit to be fabricated later. A focal point of the convergent wave $L_2$ is determined according to the positions of the eyes of a user of the display unit. The incident angles of the two light fluxes $L_1$ and $L_2$ relative to the holographic plate 70 are set according to the direction of projection relative to the holographic screen and the direction of viewing a displayed image.

The wavelength of the coherent light is selected according to the sensitivity of the hologram recording medium, and does not always coincide with the wavelength band of display light. In this case, a difference in wavelengths for preparing and using the hologram must be considered when determining the positions of the distributed index lens array plates 75 and the directions of emission of the two kinds of coherent light $L_1$ and $L_2$.

Figure 25A:
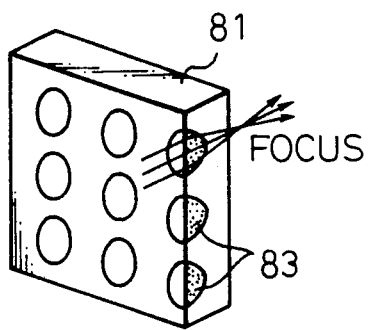
FIGS. 25a and 25b are perspective and enlarged views showing a GRIN lens array plate shown in FIGS. 23 and 24, respectively.
Figure 25B:
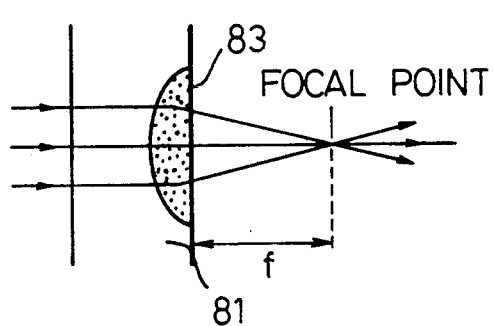

FIGS. 25a and 25b show an example of the distributed index lens array plate 75. A proton exchange method, for example, is employed to form nearly spherical regions 83 (distributed index regions) having different refractive indexes on a transparent substrate 81. An explanation of this method is not given herein, as it is well known. When an incident direction of light to the distributed index lens changes, an aberration occurs, but this will not cause a problem as long as it is in the size of a pixel.

The above explanation has been made mainly of the reflection-type holography screen 61, but a transmission-type holographic screen can also materialize a display unit (FIG. 26). It is difficult, however, to prepare a very small transmission-type hologram lens array with the distributed index lens array plates, so that another method such as mask exposure, EB drawing, etc., must be employed.

The reflection-type holographic screen has been explained for a selected single reflection wavelength, but it is possible to prepare a multilayered structure by laminating a plurality of holographic screens for selectively reflecting light of different wavelength bands, similar to FIGS. 13, 15 or 16, to thus realize a multicolor display. Instead of the multilayered structure, a plurality of the holographic screens may be multi-recorded on a single layer medium to thus realize a multicolor display.

As explained above, an image on an indicator passes through an image forming system and forms an image on the surface of a hologram of a display unit. The image on the hologram is focused at the positions of the eyes of a user of the display unit so that the user can simultaneously see the displayed image and a background image. The display unit employing the holographic screen, as shown in FIGS. 20a through 26 has an expanded visual area so that the user can stably see displayed images even if the user moves his or her head to some extent.

The embodiments maintain the advantage that displayed and background images can be simultaneously seen.

We claim:

1. A display unit comprising an indicator (1) for projecting a predetermined image, an image forming optical system (3) for forming a real image at a predetermined position according to the image projected by the indicator, and a transparent hologram screen (10) disposed at the image forming position of the image forming optical system to diffract the real image in a predetermined direction with a directivity.

2. A display unit as set forth in claim 1, wherein the transparent hologram screen (10) comprises a reflection-type hologram (4) having a function of converting, with respect to a wavelength among spectra of indicator light, spherical wave light which divergently propagates from the position of the image forming optical system, into a spherical wave light which convergently propagates toward the eyes of an observer located in a space on the same side of the hologram as that of the image forming optical system.

3. A display unit as set forth in claim 1, wherein the transparent hologram screen (10) comprises a reflection-type hologram (4) composed of multilayered holograms for diffracting, with respect to a wavelength among spectra of indicator light, spherical wave light which divergently propagates from the position of the image forming optical system toward a plurality of spots around the eyes of an observer located in a space on the same side of the hologram as that of the image forming optical system.

4. A display unit as set forth in claim 1, wherein the transparent hologram screen (10) comprises a reflection-type hologram (4) composed of a plurality of holograms which are multi-recorded on a single photosensitive medium to diffract, with respect to a wavelength among spectra of indicator light, spherical wave light which divergently propagates from the position of the image forming optical system toward a plurality of spots around the eyes of an observer located in a space on the same side of the hologram as that of the image forming optical system.

5. A display unit as set forth in claim 1, wherein the transparent hologram screen (10) comprises a reflection-type hologram (4) composed of a first hologram (4a) and a second hologram (4b) which are multilayered, the first hologram converting, with respect to a wavelength among spectra of indicator light, spherical wave light which divergently propagates from the position of the image forming optical system, into spherical wave light which convergently propagates toward a first spot located in a space on the same side of the hologram as that of the image forming optical system, the second hologram (4b) converting, with respect to a wavelength among spectra of the indicator light, spherical wave light which divergently propagates from the pupil position of the image forming optical system, into spherical wave light which convergently propagates toward a second spot located in a space on the same side of the hologram as that of the image forming optical system, the two different first and second spots being selected by the left eye and the right eye (6a, 6b) of an observer.

6. A display unit as set forth in claim 1, wherein the transparent hologram screen (10) comprises a reflection-type hologram (4) composed of a first hologram (4a) and a second hologram (4b) which are multi-recorded on a single photosensitive medium layer, the first hologram converting, with respect to a wavelength among spectra of indicator light, spherical wave light which divergently propagates from the position of the image forming optical system, into spherical wave light which convergently propagates toward a first spot located in a space on the same side of the hologram as the image forming optical system exists, the second hologram (4b) converting, with respect to a wavelength among spectra of the indicator light, spherical wave light which divergently propagates from the position of the image forming optical system, into spherical wave light which convergently propagates toward a second post located in a space on the same side of the hologram as that of the image forming optical system, the two different first and second spots being selected by the left aye and the right eye (6a, 6b) of an observer.

7. A display unit as set forth in claim 2, wherein a wavelength band-pass filter (8) for selectively transmitting light whose wavelength is in a selected reflective wavelength width of the reflection-type hologram is disposed in an optical path between the reflection-type hologram (4) and the indicator (1).

8. A display unit as set forth in claim 2, wherein an optical path folding mirror (8) having wavelength selectivity for selectively reflecting light whose wavelength is in a selected reflective wavelength width of the reflection-type hologram, is disposed in an optical path between the reflection-type hologram (4) and the indicator (1).

9. A display unit as set forth in claim 1, wherein the transparent hologram screen (10) comprises a transmission-type hologram (4') having a function of converting, with respect to a wavelength among spectra of indicator light, spherical wave light which divergently propagates from the position of the image forming optical system, into a spherical wave light which convergently propagates toward an eye of an observer located in a space on the opposite side of the hologram with respect to the image forming optical system.

10. A display unit as set forth in claim 1, wherein the transparent hologram screen (10) comprises a transmission-type hologram (4') composed of multilayered holograms for diffracting, with respect to a wavelength among spectra of indicator light, spherical wave light which divergently propagates from the position of the image forming optical system, toward a plurality of spots around the eyes of an observer located in a space on the opposite side of the hologram with respect to the image forming optical system.

11. A display unit as set forth in claim 1, wherein the transparent hologram screen (10) comprises a transmission-type hologram (4') composed of a plurality of holograms which are multi-recorded on a single photosensitive medium to diffract, with respect to a wavelength among spectra of indicator light, spherical wave light which divergently propagates from the position of the image forming optical system, toward a plurality of spots around the eyes of an observer located in a space on the opposite side of the hologram with respect to the image forming optical system.

12. A display unit as set forth in claim 1, wherein the transparent hologram screen (10) comprises a transmission-type hologram (4') composed of a first hologram (4a) and a second hologram (4b) which are multilayered, the first hologram converting, with respect to a wavelength among spectra of indicator light, spherical wave light which divergently propagates from the position of the image forming optical system, into spherical wave light which convergently propagates toward a first spot located in a space on the opposite side of the hologram with respect to the image forming optical system, the second hologram (4b) converting, with respect to a wavelength among spectra of the indicator light, spherical wave light which divergently propagates from the position of the image forming optical system, into spherical wave light which convergently propagates toward a second spot located in a space on the opposite side of the hologram with respect to the image forming optical system, the two different first and second spots being selected by the left eye and the right eye (6a, 6b) of an observer.

13. A display unit as set forth in claim 1, wherein the transparent hologram screen (10) comprises a transmission-type hologram (4b') composed of a first hologram (4a) and a second hologram (4b) which are multi-recorded on a single photosensitive medium layer, the first hologram converting, with respect to a wavelength among spectra of indicator light, spherical wave light which divergently propagates from the position of the image forming optical system, into spherical wave light which convergently propagates toward a first spot located in a space on the opposite side of the hologram with respect to the image forming optical system, the second hologram (4b) converting, with respect to a wavelength among spectra of the indicator light, spherical wave light which divergently propagates from the position of the image forming optical system, into spherical wave light which convergently propagates toward a second spot located in a space on the opposite side of the hologram with respect to the image forming optical system, the two different first and second spots being selected by the left eye and the right eye (6a, 6b) of an observer.

14. A display unit as set forth in claim 1, wherein the image forming optical system is provided with a variable aperture diaphragm (9) for controlling a visible range of a displayed image.

15. A display unit as set forth in claim 1, wherein the transparent hologram screen comprises a transparent curved substrate (10') having a hologram, and the image forming optical system has field curvature aberration for forming an image on the curved hologram screen according to a planar image provided by the indicator.

16. A display unit as set forth in claim 1, wherein the hologram screen comprises a reflection-type hologram (13), which deflects the real image toward the positions of eyes (6a, 6b) of a user due to a light diffracting phenomenon of the hologram so that the user can see the image on the reflection-type hologram (13), the reflection-type hologram (13) reflecting light having a wavelength band around a wavelength $\lambda 1$ toward the position of one (6a) of the eyes of the user while reflecting light having a wavelength band around a wavelength $\lambda 2$ which is different from the wavelength $\lambda 1$ toward the other eye (6b) of the user, so that the user can see the image with the light of different wavelength bands through the left eye and the right eye.

17. A display unit as set forth in claim 16, wherein the reflection-type hologram (13) comprises a first reflection-type hologram (13a) for reflecting the light having a wavelength band around the wavelength $\lambda 1$ and a second reflection-type hologram (13b) for reflecting the light having a wavelength band around the wavelength $\lambda 2$, the holograms being adhered to each other to form a two-layer structure.

18. A display unit as set forth in claim 16, wherein the reflection-type hologram (13) comprises a first reflection-type hologram (13a) for reflecting the light having a wavelength band around the wavelength $\lambda 1$ and a second reflection-type hologram (13b) for reflecting the light having a wavelength band around the wavelength $\lambda 2$, the holograms being multi-recorded on a single hologram medium.

19. A display unit as set forth in claim 16, wherein a difference between the wavelengths $\lambda 1$ and $\lambda 2$ is selected to be substantially equal to a reflective wavelength band width of the first and second reflection-type holograms (13a, 13b) so that reflective spectra of the first and second reflection-type holograms (13a, 13b) may overlap a little to reduce the difference between the wavelengths $\lambda 1$ and $\lambda 2$.

20. A display unit as set forth in claim 16, wherein the wavelengths $\lambda 1$ and $\lambda 2$ are selected such that the indicator means can produce an image to be reflected by the first reflection-type hologram (13a) but not by the second reflection-type hologram (13b), as well as an image to be reflected by the second reflection-type hologram (13b) but not by the first reflection-type hologram (13a).

21. A display unit as set forth in claim 20, wherein an indicator (1) produces an image for the left eye and an image for the right eye with the light having wavelength bands around the wavelengths $\lambda 1$ and $\lambda 2$, respectively, according to a parallax of the left eye (6a) and right eye (6b), so that the user can obtain a stereoscopic vision.

22. A display unit as set forth in claim 1, wherein the hologram screen comprises a reflection-type hologram (13), which deflects the real image toward the positions of eyes (6a, 6b) of a user due to a light diffracting phenomenon of the hologram so that the user can see the image on the reflection-type hologram (13),
the reflection-type hologram (13) reflecting light having N wavelength bands around N different wavelengths $\lambda 1, \ldots \lambda 2$ (N>2) toward the positions of the left eye and the right eye of the user of the display unit or toward a plurality of positions around the eyes of the user, so that the user of the display unit can see the image with a mixture of colors of the plurality of wavelength bands.

23. A display unit as set forth in claim 22, wherein the reflection-type hologram (13) is made by multi-recording a plurality of interference fringes on a single hologram medium.

24. A display unit as set forth in claim 22, wherein the reflection-type hologram (13) is made by laminating a plurality of hologram films.

25. A display unit as set forth in claim 22, wherein the N different wavelengths $\lambda 1, \ldots \lambda n$ are selected to have substantially the same intervals as in the reflective wavelength bands of the reflection-type hologram (13).

26. A display unit as set forth in claim 1, wherein the hologram screen (61) comprises reflection-type or transmission-type holographic lenses (63) arrayed on a single medium layer (73), the incident axes and outgoing axes of the holographic lenses being oriented differently from one another, little by little.

27. A display unit as set forth in claim 26, wherein the incident axes of the holographic lenses (63) of the hologram screen (61) pass through a principal point of the projection lens system (3) while the outgoing axes thereof pass through the positions of eyes (6a, 6b) of a user of the display unit.

28. A display unit as set forth in claim 26, wherein the hologram screen comprises a reflection-type hologram which is formed by arranging lens array plates 75 on each side of a holographic plate and by irradiating the holographic plate (70) with coherent light through the lens array plates.

29. A display unit as set forth in claim 26, wherein the hologram screen comprises a transmission-type hologram.

* * * * *

REEXAMINATION CERTIFICATE (2881st)

United States Patent [19]

Kato et al.

[11] B1 5,187,597
[45] Certificate Issued May 14, 1996

[54] DISPLAY UNIT

[75] Inventors: Masayuki Kato; Junji Tomita; Tsuyoshi Matsumoto, all of Atsugi; Hirokazu Aritake; Shin Eguchi, both of Isehara, all of Japan

[73] Assignee: Fujitsu Limited, Kawasaki, Japan

Reexamination Request:
No. 90/003,851, Jun. 1, 1995

Reexamination Certificate for:
Patent No.: 5,187,597
Issued: Feb. 16, 1993
Appl. No.: 719,230
Filed: Jun. 21, 1991

[30] Foreign Application Priority Data

Jun. 29, 1990 [JP] Japan .................. 2-170224
Feb. 4, 1991 [JP] Japan .................. 3-013343

[51] Int. Cl.⁶ ............................ G02B 5/32
[52] U.S. Cl. .............. 359/22; 359/13; 359/15; 359/630
[58] Field of Search .............. 359/13, 14, 15, 359/16, 19, 22, 23, 32, 33

[56] References Cited

U.S. PATENT DOCUMENTS

| | | |
|---|---|---|
| 4,669,810 | 6/1987 | Wood ........................... 359/15 |
| 4,763,990 | 8/1988 | Wood . |
| 4,790,613 | 12/1988 | Moss ........................... 359/15 |
| 4,880,287 | 11/1989 | Moss ........................... 359/14 |
| 4,889,780 | 12/1989 | Cosner ......................... 359/13 |
| 4,930,847 | 6/1990 | Cederquist ................... 350/3.6 |
| 5,164,848 | 11/1992 | Firth et al. ................... 359/13 |

FOREIGN PATENT DOCUMENTS

| | | | |
|---|---|---|---|
| 0202987 | 11/1986 | European Pat. Off. | G02B 27/00 |
| 0200022 | 11/1986 | European Pat. Off. | 359/13 |
| 3835308 | 4/1990 | Germany . | |
| 2020843 | 11/1979 | United Kingdom | G02B 27/14 |
| WO-A-8808146 | 10/1988 | WIPO | G02B 27/22 |
| 88/09942 | 12/1988 | WIPO | 359/14 |
| WO-A-8903059 | 4/1989 | WIPO | G02B 27/00 |

OTHER PUBLICATIONS

Proceeding of the IEEE 1992 Aerospace and Electronics Conference, vol. 2, NAECON, pp. 755–759, Jerold H. Gard 'Holographic HUDs De–Mystified'.

*Primary Examiner*—Jon W. Henry

[57] ABSTRACT

A display unit including an indicator (1) for projecting a predetermined image, an image forming optical system (3) for forming a real image at a predetermined position according to the image projected by the indicator, and a transparent hologram screen (10) disposed at the image forming position of the image forming optical system to diffract the real image in a predetermined direction with a directivity.

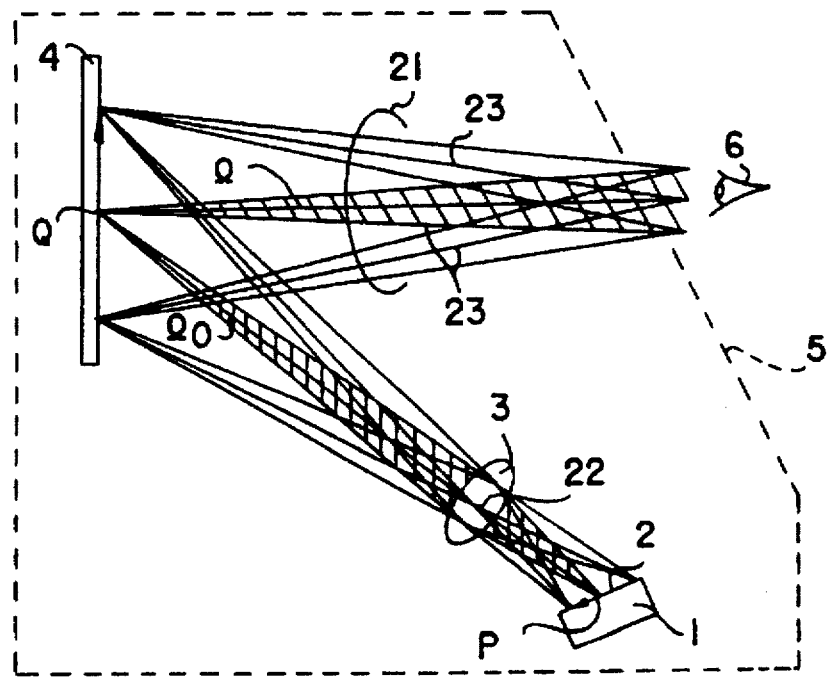

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–15, 22–29 is confirmed.

Claim 16 is cancelled.

Claims 17–21 are determined to be patentable as amended.

New claims 30 and 31 are added and determined to be patentable.

17. A display unit as set forth in claim [16] *30*, wherein the reflection-type hologram (13) comprises a first reflection-type hologram (13a) for reflecting the light having a wavelength band around the wavelength λ1 and a second reflection-type hologram (13b) for reflecting the light having a wavelength band around the wavelength λ2, the holograms being adhered to each other to form a two-layer structure.

18. A display unit as set forth in claim [16] *30*, wherein the reflection-type hologram (13) comprises a first reflection-type hologram (13a) for reflecting the light having a wavelength band around the wavelength λ1 and a second reflection-type hologram (13b) for reflecting the light having a wavelength band around the wavelength λ2, the holograms being multi-recorded on a single hologram medium.

19. A display unit as set forth in claim [16] *31*, wherein a difference between the wavelengths λ1 and λ2 is selected to be substantially equal to a reflective wavelength band width of the first and second reflection-type holograms (13a, 13b) so that the reflective spectra of the first and second reflection-type holograms (13a, 13b) may overlap a little to reduce the difference between the wavelengths λ1 and λ2.

20. A display unit as set forth in claim [16] *31*, wherein the wavelengths λ1 and λ2 are selected such that the indicator means can produce an image to be reflected by the first reflection-type hologram (13a) but not by the second reflection-type hologram (13b), as well as an image to be reflected by the second reflection-type hologram (13b) but not by the first reflection-type hologram (13a).

21. A display unit as set forth in claim 20, wherein an indicator (1) produces an image for [the left] *said one* eye and an image for [the right eye] *said other one of said eyes* with the light having wavelength bands around the wavelengths λ1 and λ2, respectively, according to a parallax of [the left] *said one* eye (6a) and [right eye] *said other one of said eyes* (6b), so that the user can obtain a stereoscopic vision.

*30. A display unit comprising an indicator (1) for projecting a predetermined image, an image forming optical system (3) for forming a real image at a predetermined position according to the image projected by the indicator, and a reflection-type transparent hologram screen (13) disposed at the image forming position of the image forming optical system to diffract and reflect said real image in a predetermined direction with a directivity toward the positions of eyes (6a, 6b) of a user due to a light diffracting phenomenon of the hologram so that the user can see the image on said reflection-type hologram screen (13), said reflection-type hologram screen (13) reflecting light having a wavelength band around a wavelength λ1 toward the position of one (6a) of said eyes of the user while reflecting light having a wavelength band around a wavelength λ2 which is different from the wavelength λ1 toward the other one (6b) of said eyes of the user, so that the user can see the image with the light of different wavelength bands through said one eye and said other one of said eyes.*

*31. A display unit as set forth in claim 30, wherein the reflection-type hologram screen (13) comprises a first reflection type hologram (13a) for reflecting said light having a wavelength band around the wavelength λ1 and a second reflection-type hologram (13b) for reflecting said light having a wavelength band around the wavelength λ2.*

\* \* \* \* \*